Sept. 18, 1928.

J. H. BEHEE, JR 1,684,431

PROCESS OF LETTERING ON STONE MONUMENTS AND OTHER HARD SUBSTANCES

Filed Sept. 25, 1926

INVENTOR
Joseph H. Behee, Jr,
BY
M. C. Gillham
ATTORNEY

Patented Sept. 18, 1928.

1,684,431

UNITED STATES PATENT OFFICE.

JOSEPH H. BEHEE, JR., OF INDEPENDENCE, MISSOURI.

PROCESS OF LETTERING ON STONE MONUMENTS AND OTHER HARD SUBSTANCES.

Application filed September 25, 1926. Serial No. 137,804.

It is my experience that hitherto the lettering of stone monuments and the like the stone has been prepared for cutting by the sand blast by affixing to the face of the stone an adhesive substance like glue and then marking thereon the design or letters to be cut in the face of the stone and then carving the pattern or model through the glue to expose the face of the stone corresponding to the design or letters and then subjecting the exposed face of the stone to a sand blast in the well understood manner. This process is slow and expensive and is seldom accurate and precise.

This invention relates to the process of lettering stone monuments by means of the sand blast, and has for its object to render the process more expeditious and considerably cheaper.

I attain these objects and other advantages by means of the means illustrated in the accompanying drawing in which Figure 1 is a top plan view of a stone tablet provided with a sheet of adhesive composition through which a skeleton letter is pressed to the surface of the stone.

Similar numerals of reference refer to corresponding parts throughout the several views.

Figure 1:
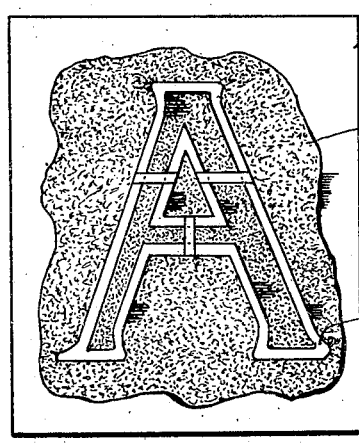
Figure 2:
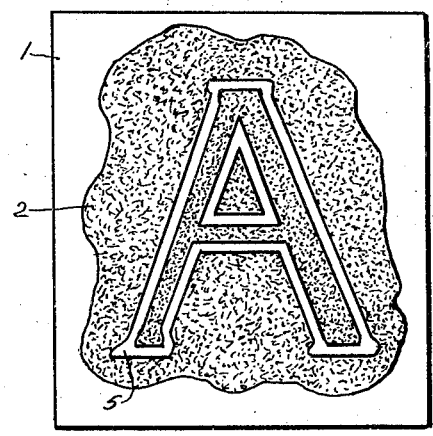
Figure 2 is a top plan view of a stone tablet having thereon an adhesive composition through which a skeleton letter has been pressed and leaving the outline of the letter on the face of the stone and ready to be cut therein by a sand blast.
Figures 3, 4:
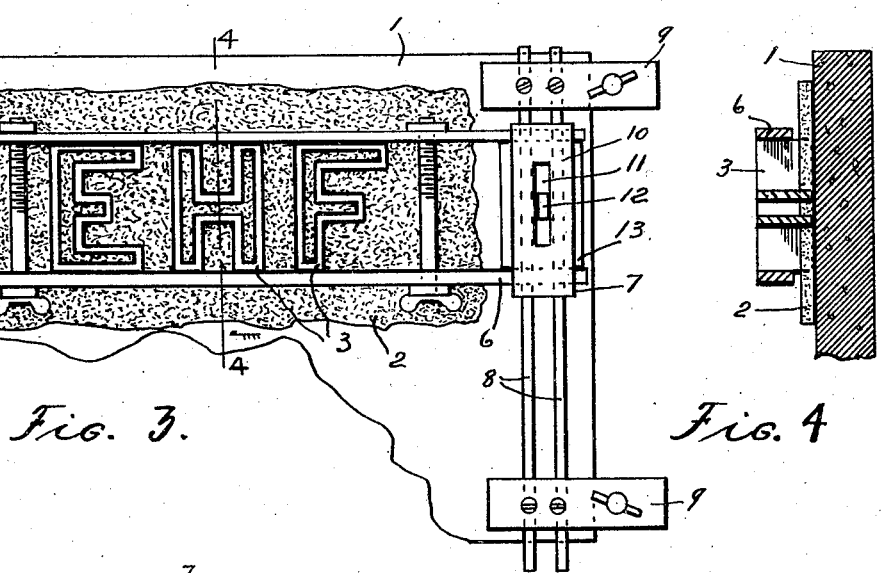
Figure 3 is a fragment of a stone monument provided with an adhesive composition pierced by a series of letters held in a frame and clamped to the stone by a clamping device.
Figure 4 is a cross section through the stone, adhesive composition and frame taken on the line 4—4 in Figure 3, and showing the adhesive composition pierced to the stone by the skeleton letter.
Figure 5:
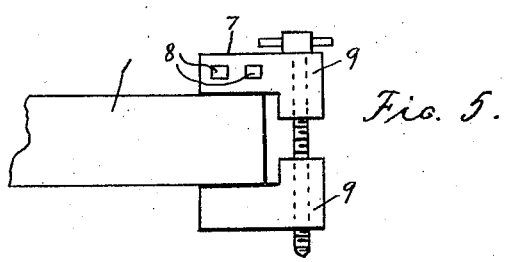
Figure 5 is an end view of the stone, and showing an end of the clamping device thereon.

The numeral 1 designates a stone tablet provided on its face with an adhesive composition 2 having the consistency of gelatine. Through the adhesive composition to the surface of the stone there-below is pressed a skeleton form letter 3, as shown in Figure 1 and Figure 4, and where it is left for several minutes until the composition has stiffened or hardened and then withdrawn from the composition and exposing the surface of the stone corresponding to the outline form of the letter, as shown at 5 in Figure 2 and in readiness for applying the sand blast, not shown but well understood. If a series of letters, words, or sentences are to be lettered on the stone they may be arranged in a composing frame 6 and which may be clamped to the stone by a clamping device 7 having guiding square rods 8 adjustably mounted in clamping members 9. A crosshead 10 is slidably mounted on the rods 8 and is provided with an elongated slot 11 adapted to slidably receive a stud 12 on a plate 13 which is carried by the composing frame. The crosshead 10 cooperates with the clamping members to hold the composing frame in place and to press the skeleton letters through the adhesive composition to the stone. The clamping members are provided with power screws to embrace the stone between them.

The art or process consists of spreading upon the face of the stone to be lettered a sheet of adhesive composition of suitable thickness and normally of the consistency of gelatine; then pressing a metal skeleton design, letter or letters through the adhesive substance until the edges of the same shall impinge upon the stone and then withdrawing the skeleton letters from the adhesive substance and leaving the outline form of the letters exposed on the face of the stone; and then subject the exposed surface of the stone to a sand blast to countersink the outlines of the letters in the stone and to a suitable depth to produce the letters in relief then, after removing the adhesive subsance from the stone outwardly of the letters, the sand blast is applied to reducing the face of the stone to a plane corresponding to the plane of the countersink. If a countersink letter is desired the skeleton pattern of the letter is pressed through the adhesive substance to a bearing on the stone and then withdrawn thereby leaving the outline form of the letter exposed on the surface of the stone, whereupon, the cores of the adhesive substance within the letters are removed and the exposed surface of the stone subjected to a sand blast to sink the letter in the stone.

I claim:

The process of lettering stone monuments consisting of applying on the face of the stone a composition having the consistency of gelatine and pressing therethrough outline forms of letters and withdrawing the same after the composition has stiffened and thereby leaving the face of the stone exposed corresponding to the outline forms of the letters and then applying a sand blast to countersink the outline forms of letters in the stone and then removing the composition from the face of the stone about the countersunk outline forms of the letters and apply thereto a sand blast and reduce the same to the plane of the countersunk outline of the letters to thereby form letters in relief on the face of the stone.

JOSEPH H. BEHEE, Jr.